(12) United States Patent
Wray

(10) Patent No.: US 10,009,973 B1
(45) Date of Patent: Jun. 26, 2018

(54) REDUNDANT POWER FOR LIGHTING SYSTEM

(71) Applicant: Donald L. Wray, Ocala (FI)

(72) Inventor: Donald L. Wray, Ocala (FI)

(73) Assignee: USAI, LLC, New Windsor, NY (US)

( * ) Notice: Subject to any disclaimer, the term of this patent is extended or adjusted under 35 U.S.C. 154(b) by 0 days. days.

(21) Appl. No.: 15/450,238

(22) Filed: Mar. 6, 2017

(51) Int. Cl.
*H05B 37/02* (2006.01)
*H05B 33/08* (2006.01)

(52) U.S. Cl.
CPC ....... *H05B 33/0845* (2013.01); *H05B 33/089* (2013.01); *H05B 33/0812* (2013.01); *H05B 37/0272* (2013.01)

(58) Field of Classification Search
CPC ............ H05B 37/0272; H05B 33/0815; H05B 33/0818; H05B 33/0845; H05B 33/0809; H05B 33/0848; H05B 33/0896
USPC ........ 315/161, 294, 297, 307, 122, 192, 224
See application file for complete search history.

(56) References Cited

U.S. PATENT DOCUMENTS

| | | | | |
|---|---|---|---|---|
| 7,557,521 B2 * | 7/2009 | Lys | ...................... | F21S 48/325 315/224 |
| 2008/0030142 A1 * | 2/2008 | Jinno | ...................... | G09G 3/294 315/169.4 |
| 2008/0202312 A1 * | 8/2008 | Zane | ...................... | G09G 3/342 84/297 R |
| 2010/0134041 A1 * | 6/2010 | Radermacher | ....... | H05B 33/083 315/294 |
| 2010/0225240 A1 * | 9/2010 | Shearer | .............. | H05B 37/0263 315/247 |
| 2013/0187561 A1 * | 7/2013 | Franck | ............... | H05B 33/0815 315/201 |
| 2014/0265880 A1 * | 9/2014 | Taipale | .............. | H05B 37/0263 315/158 |
| 2014/0265885 A1 * | 9/2014 | Hu | ....................... | H05B 33/083 315/186 |
| 2015/0008746 A1 * | 1/2015 | Youn | ........................ | G06F 1/30 307/65 |
| 2015/0145422 A1 * | 5/2015 | Hiramatu | ........... | H05B 33/0803 315/161 |
| 2016/0123833 A1 * | 5/2016 | Schwartz | ................ | G01M 3/18 137/487.5 |
| 2016/0125863 A1 * | 5/2016 | Henderson | ........... | G10H 1/0058 700/94 |
| 2017/0070161 A1 * | 3/2017 | MacAdam | ......... | H05B 33/0815 |

* cited by examiner

*Primary Examiner* — Douglas W Owens
*Assistant Examiner* — Syed M Kaiser
(74) *Attorney, Agent, or Firm* — St. Onge Steward Johnston & Reens LLC

(57) ABSTRACT

A digital control module that is used to power LED light fixtures connected thereto, the digital control module allowing for the continued control and powering of some or all of the connected LED light fixtures even in the event that one of the DC power supplies in the digital control module fails.

21 Claims, 7 Drawing Sheets

REDUNDANT POWER FOR LIGHTING SYSTEM

FIELD OF THE INVENTION

The system relates to a digital power module that is used to provide power and control to LED light fixtures and more particularly, to a system that provides increased reliability for powering and controlling LED light fixtures.

BACKGROUND OF THE INVENTION

The lighting industry has increasingly looked to develop more efficient and reliable light fixtures. These efforts have led to the development of light fixtures utilizing Light Emitting Diodes (LEDs) as light sources. LEDs used for interior lighting are typically high output devices which, at the same time, allow for precise control of the intensity of light emitted by the various LEDs and overall color of a light fixture.

LEDs differ from other types of light sources (e.g., incandescent, fluorescent, High Intensity Discharge (HID), etc.) in that LEDs use much less energy, and the LEDs themselves have a very long lifespan and control of the light emanating from an LED can be tightly controlled.

However, unlike other types of light sources, LED lighting systems require the use of a more specialized power supply to convert AC power to DC power to drive the LEDs. These LED power supplies have been designed to provide a "constant voltage" or a "constant current" to the LEDs.

The majority of LED light fixtures are fabricated by connecting a plurality of LEDs together (in series or parallel) to form a group of LEDs. Where the LEDs use a "constant current" driver, a "constant voltage" power supply is typically used. When a group of LEDs does not use a "constant voltage" driver, a power supply that provides a "constant current" is typically utilized.

While the reliability of LEDs is relatively high when compared to other types of conventional lighting fixtures, the LED lighting industry has struggled to create a comparably reliable power supply for use with LED light fixtures. So LED power supplies are often a point of failure of LED lighting systems, and when a power supply fails, entire groups of LEDs go dark.

Thus, there remains a need for an LED lighting system that provides a more reliable LED power supply.

SUMMARY OF THE INVENTION

Accordingly, what is desired then is an LED light fixture/system with a power supply that should the power supply fail, not all the LEDs in the light fixture will go dark.

It is further desired to provide a light fixture/system with a power supply that is more reliable than know systems.

It is still further desired to provide a light fixture/system such that, if a power supply should fail, that the LEDs in the light fixture/system will continue to function.

It is also desire to provide a light fixture/system that, in the event of a power supply failure, a notification will be supplied to ensure that the failure is known to maintenance personnel.

These and other objects are achieved in one example by the provision of a light fixture/system that utilizes multiple power supplies to provide power to various groups of LED light fixtures. To provide a more reliable power source, it is contemplated that the outputs of the multiple power supplies can be coupled together.

The LED lighting system may be provided with a Digital Power Module (DPM), which functions as a primary component of the system and contains a controller operable to receive digital lighting control signals (e.g., DMX, DALI, etc.) and to provide digital control signals to various LED light fixtures, various DC power supplies operable to power LED light fixtures, and fixture interfaces to control the functionality of the LED light fixtures.

In the prior art, if a power supply were to fail, all of the connected LED light fixtures would lose DC power and thus the lights would go out. The DPM being a multi-output port device presents several opportunities for preventing total (or even partial) power failure due to a power supply failing.

In a first configuration at least two DC power supplies are provided, with each DC power supply being connected to an associated port and sized to provide enough DC power to illuminate the maximum number of fixtures connected to the port. In this way a single power supply failure would cause only the lights connected to that port to go dark.

Another feature provided in this configuration is that the outputs of the two DC power supplies are coupled to each other via diodes, which in turn are connected to the input of a voltage regulator, which powers the controller. This allows control power (e.g., 5V DC) to be constantly supplied to the controller (and the processor thereof) so that control signals may continue to be transmitted to the LED light fixtures allowing for control of the LED light fixtures that still have DC power.

A second configuration avoids even the partial power outage described above. In this second configuration utilizes two bulk DC power supplies where each DC power supply is sized to independently handle the full load of all the fixtures connected to the DPM simultaneously. As above, the outputs of the DC power supplies have their outputs connected to each other via diodes so as to power the controller along with all of the LED light fixtures, even if one of the two DC power supplies fails. An advantage of this type of configuration is that during normal operation, the two DC power supplies share the load and the Mean Time Between Failure (MTBF) is therefore greatly increased (highly reliable) as they will only be supplying a portion (e.g., half) of the rated load when the LED light fixtures are operating at full power, under normal conditions. Thus, in all cases the LED lights fixtures would always be operational unless both of the DC supplies simultaneously failed.

A third configuration is similar to the second configuration with the exception that one more DC power supply is provided than the total groups of LED light fixtures. This configuration is termed N+1.

This configuration effectively provides a "spare" DC power supply such that if any single DC power supply were to fail, the spare DC power supply would pick up the load for and provide the necessary power to the LED light fixtures that were supplied by the failed power supply. This has similar advantages of the second configuration with all the DC supplies sharing the load, which means they are not being driven at full power resulting in an increase to the MTBF.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one embodiment, an LED lighting system for controlling and providing power to at least a first set of one or more LED light fixtures and a second set of one or more LED light fixtures is provided, the LED lighting system comprising a digital power module having a first DC power supply having a first output operable to supply power to the first set of LED light fixtures, and a second DC power supply having a second output operable to supply power to the second set of LED light fixtures. The digital power module also includes a controller operable to control the first and second sets of LED light fixtures, the controller including a transmitter operable to transmit a first control signal to the first set of LED light fixtures and a second control signal to the second set of LED light fixtures, and a receiver coupled to the controller, the controller being operable to receive a third control signal from an interface through the receiver for controlling the first and second sets of LED light fixtures. The LED lighting system is provided such that the first output is connected to the second output.

In another embodiment, an LED lighting system for controlling and providing power to at least a first set of one or more LED light fixtures and a second set of one or more LED light fixtures is provided, the LED lighting system comprising a digital power module having a first DC power supply having a first output operable to supply power to the first set of LED light fixtures, and a second DC power supply having a second output coupled to the first output and operable to supply power to the second set of LED light fixtures. The digital power module also includes a controller operable to control the first and second sets of LED light fixtures, the controller including a transmitter operable to transmit a first control signal to the first set of LED light fixtures and a second control signal to the second set of LED light fixtures, and a receiver coupled to the controller, the controller being operable to receive a third control signal from an interface through the receiver for controlling the first and second sets of LED light fixtures. The LED lighting system is provided such that the first and second DC power supplies are each operable to independently power both the first and second sets of LED light fixtures simultaneously.

Other objects of the invention and its particular features and advantages will become more apparent from consideration of the following drawings and accompanying detailed description.

DETAILED DESCRIPTION OF THE INVENTION

Figure 1:
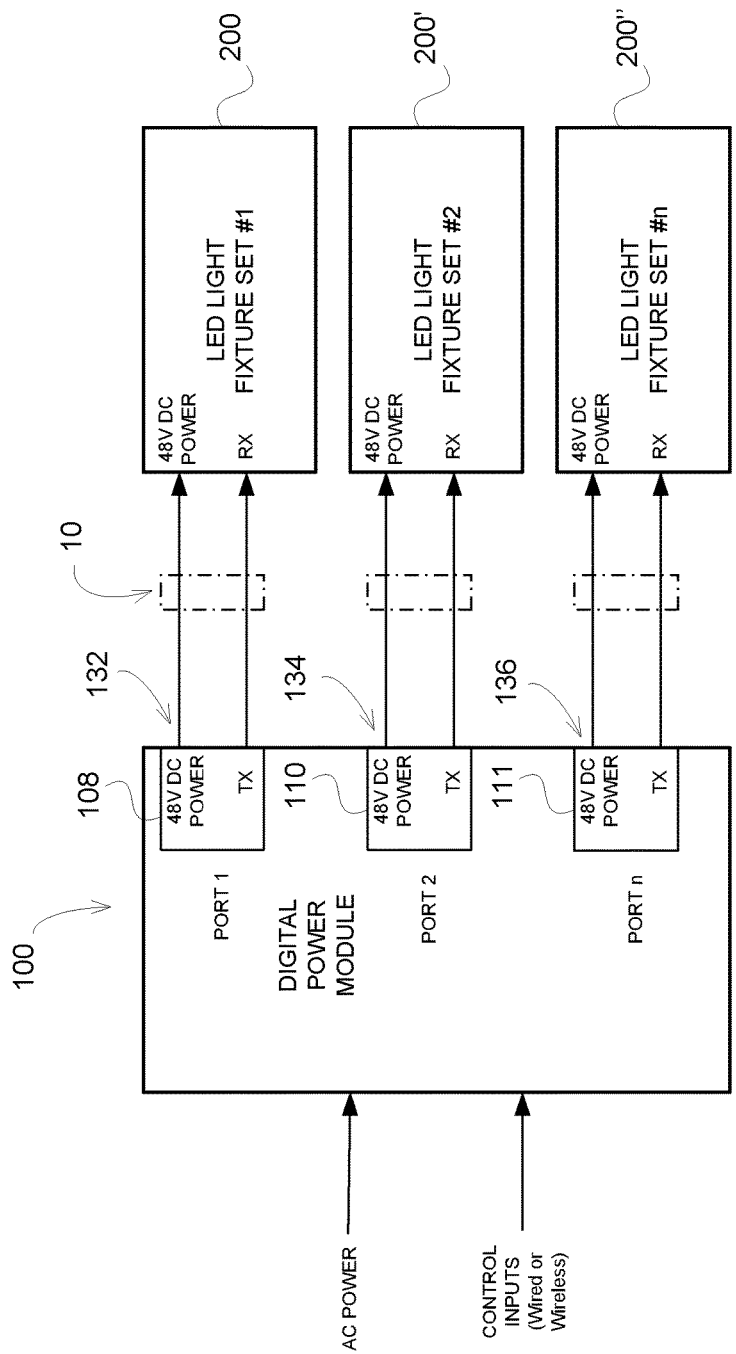
FIG. 1 is a block diagram of an embodiment of the present invention.

Referring now to the drawings, wherein like reference numerals designate corresponding structure throughout the views.

Figure 2:
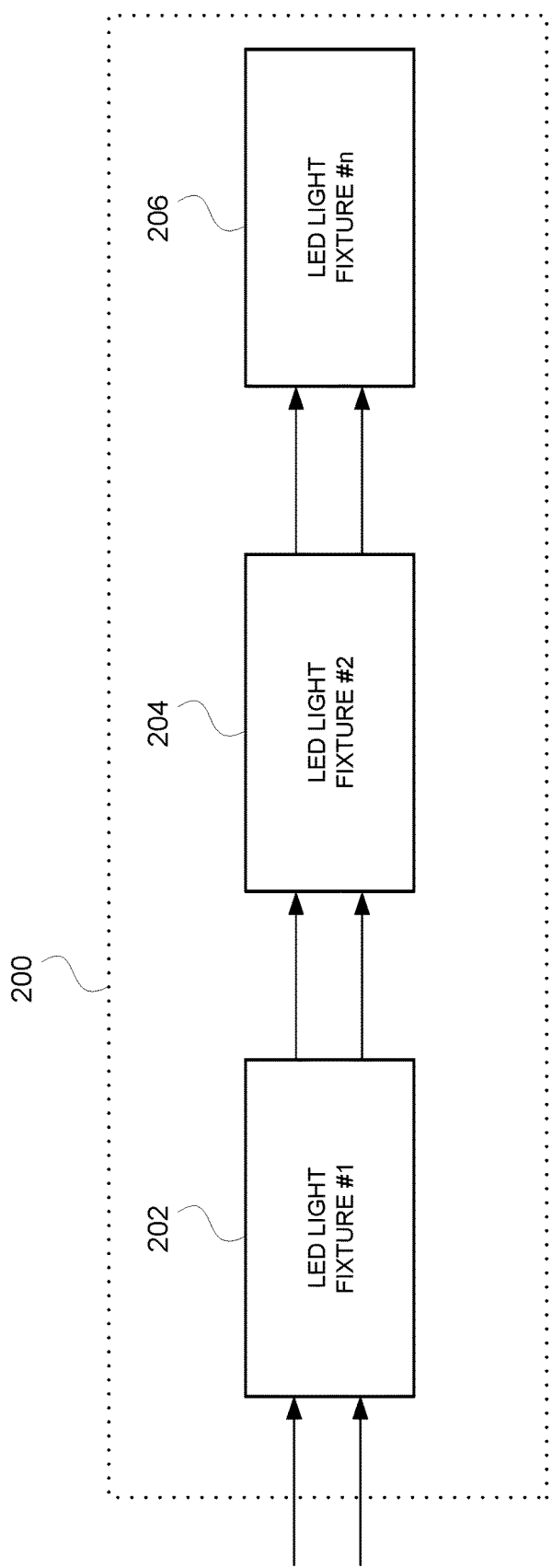
FIG. 2 is a block diagram according to FIG. 1.

Referring to FIGS. 1 & 2, block diagrams of an LED lighting system are illustrated. The LED lighting system includes Digital Power Module (DPM) 100 connected to a plurality of sets of LED light fixtures (200, 200', 200") by means of wiring 10. DPM 100 acts as a central hub and each set of LED light fixtures is connected to DPM 100 separately, for example, in a star configuration. Each set of LED light fixtures can include one or more LED light fixtures (202, 204, 206) up to a predetermined maximum number of light fixtures, which in one example, may comprise 32 LED light fixtures. The LED light fixtures in each set can be interconnected, for example, in a line or string (daisy-chain) configuration. DPM 100 is operable to receive AC power and separate control inputs for powering and controlling DPM 100 and for powering and controlling each set of LED light fixtures (200, 200', 200"). The control input may comprise a wired or wireless local user interface, such as a 0-10V dimmer, or may comprise a wired or wireless networked control signal (e.g., a DMX, DALI or other suitable signal). DPM 100 can convey the control input to the LED light fixtures without processing (e.g., by relay), or with processing or modification by DPM 100. It will be understood by those of skill in the art that in the case of DMX control input, multiple (e.g., up to thirty-two) DPM 100 may be connected on one DMX cable.

Each set of LED light fixtures (200, 200', 200") can be physically separate, and located remotely from DPM 100. For example the LED light fixtures can be disposed throughout one or more rooms or areas, while DPM 100 can be located in a central area of a room or ceiling. LED light fixtures (200, 200', 200") can be connected to DPM 100 by wiring 10 capable of providing power, and optionally control signals, to the set of LED light fixtures. For example, the wiring 10 can be low-voltage, multi-conductor, twisted-pair cabling, such as CAT 5 cabling, or the like. Preferably, the same or similar wiring can interconnect the LED light fixtures 202, 204, 206 within each set of LED light fixtures, to provide power, and optionally control signals, to the entire set of LED light fixtures. Optionally, DPM 100 can transmit control signals wirelessly to the LED light fixtures of each set of LED light fixtures (as a group, or individually) independent of the power supplied to the LED light fixtures by DPM 100.

DPM 100 can include a plurality of ports 108, 110, 111, where one port is provided for each set of LED light fixtures (200, 200', 200") and each port is operable to provide power (e.g., DC power), and optionally control signals independent of the power (e.g., digital control signals such as DMX, DALI, or other suitable signals), to one set of LED light fixtures. Each port can be adapted to receive a standard modular connector such as an RJ-45 modular connector. Port n 111 is provided to illustrate that any number of ports (and any number of sets of LED light fixtures) can effectively be used without deviating from the invention.

The LED light fixtures 202, 204, 206 of the various sets of LED light fixtures can each include a processor and a receiver (e.g., an RS-485 receiver) capable of receiving a digital control signal from DPM 100 independent of the supplied power. The LED light fixture can also include any number of output channels to drive multiple strings of connected LEDs (e.g., RGB/W).

Figure 3:
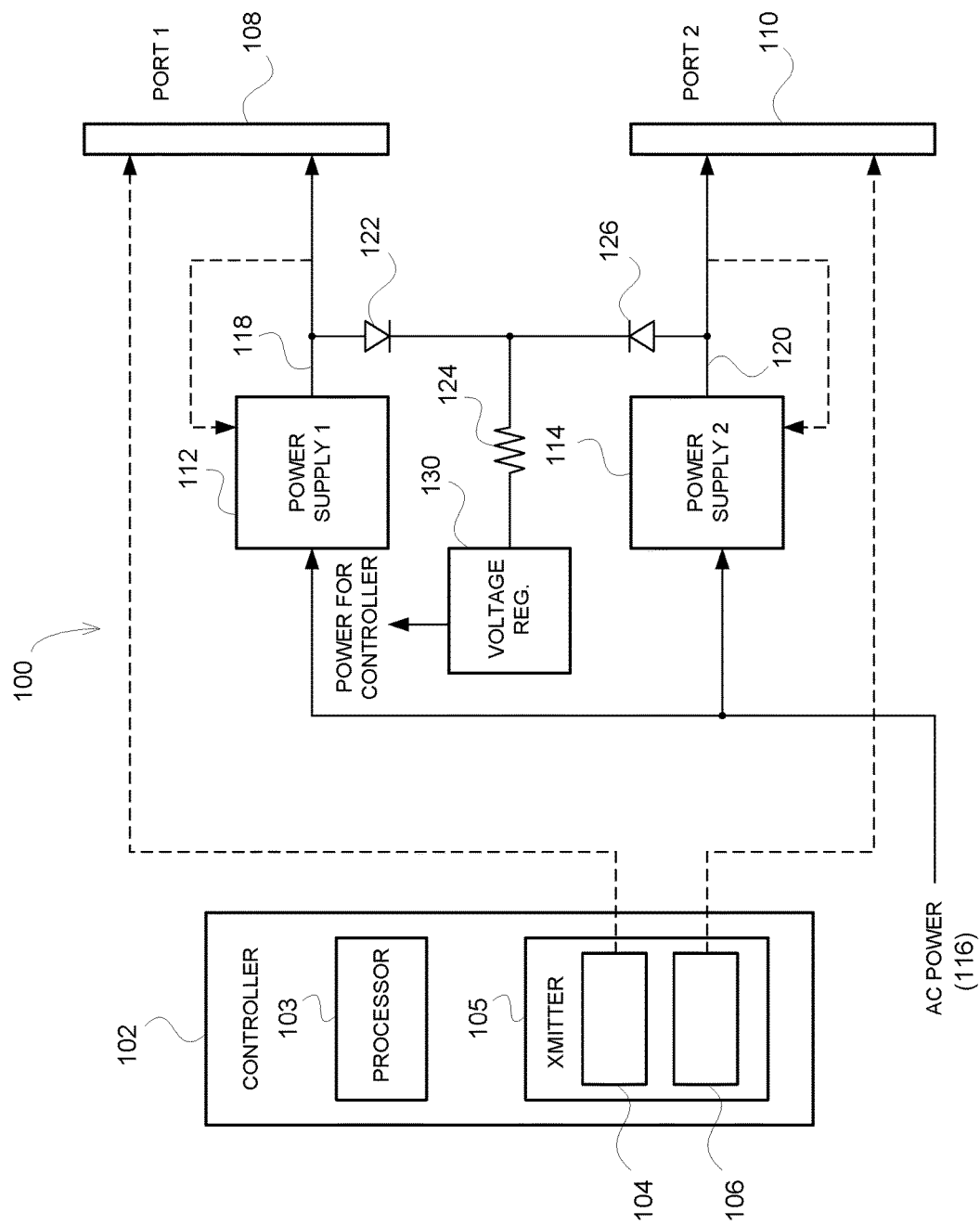
FIG. 3 is a block diagram according to FIG. 1.
Figure 4:
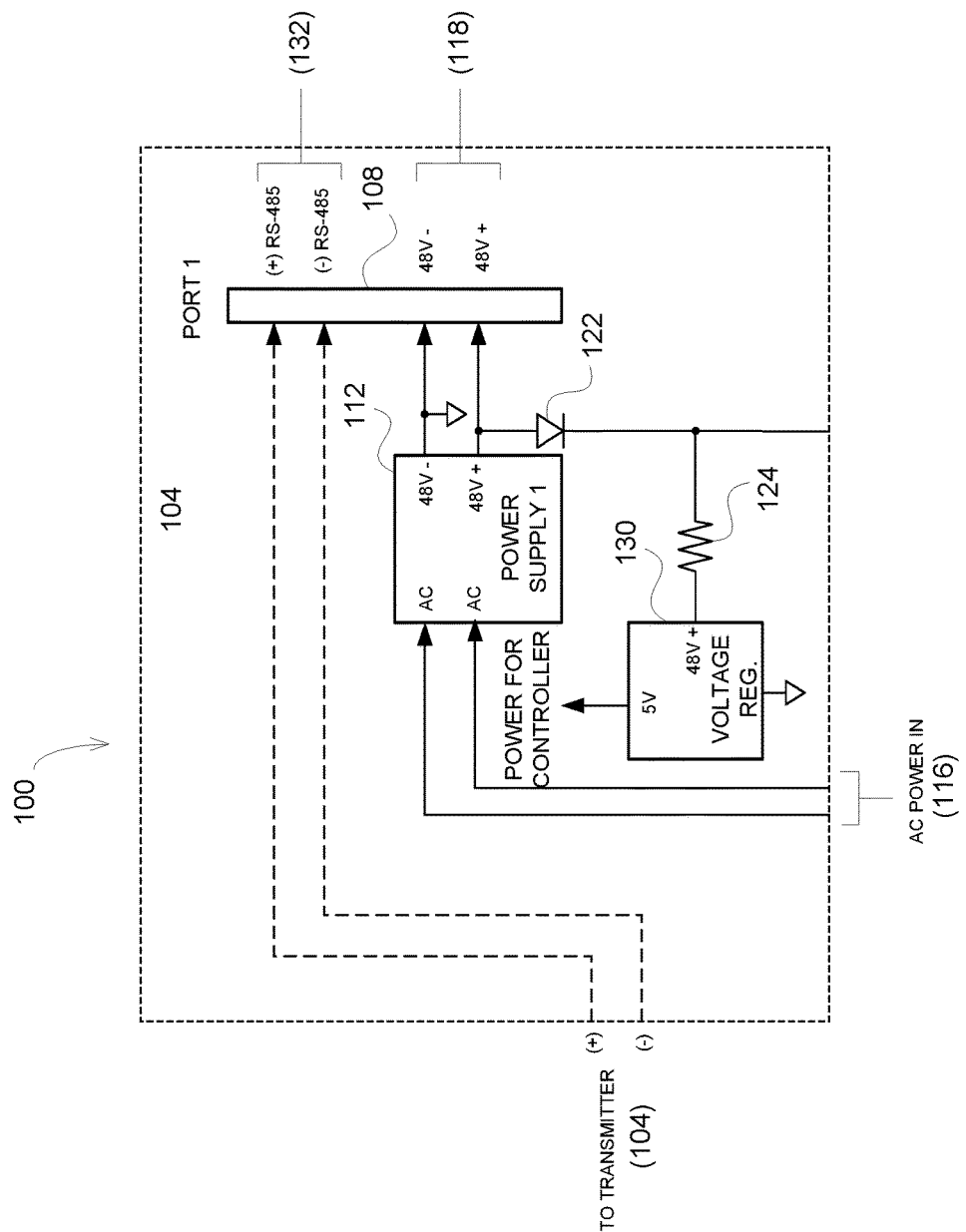
FIG. 4 is a block diagram according to FIG. 3.

Referring to FIGS. 3 & 4 block diagrams of DPM 100 are shown. DPM 100 has a controller 102, which can include a processor 103, such as a microprocessor, digital signal processor, field programmable gate array or another suitable control scheme. Controller 102 also includes transmitter 105 which can be a wired and/or wireless transmitter. Transmitter 105 can include wired transmitter 1 104 and wired transmitter 2 106, which can, for example, can be RS-485 transmitters/drivers. Wired transmitter 1 104 is connected to Port 1 108 of the DPM 100, while wired transmitter 2 106 is connected to Port 2 110 of the DPM 100. Transmitter 105 is operable to transmit control signals from DPM 100 to control the sets of LED light fixtures (not shown) that are connected to the respective ports.

DPM 100 includes power supply 1 112 and power supply 2 114, each of which is connected to and receives AC power 116 from an AC power source (not shown). The output 118 of power supply 1 112 feeds into port 1 108 to supply power to the set of LED light fixtures (200, 200' or 200") that will be connected to that port. Likewise, the output 120 of power supply 2 114 feeds into port 2 110 to supply power to the set of LED light fixtures (200, 200', 200") that will be connected to that respective port. Power supply 1 112 and power supply 2 114 are each operable to provide, for example, 48 volts of power to at least one set of LED light units. In one configuration, a feedback mechanism is provided as a sensed output voltage that is fed back to each power supply individually (shown in dashed line), such that each power supply may independently control its output voltage.

In addition, each power supply is also operable to independently provide sufficient power to operate controller 102 via voltage regulator 130. Output 118 is connected to voltage regulator 130 via a first output diode 122, while output 120 is connected to voltage regulator 130 via a second output diode 126, both diodes being coupled to voltage regulator 130 through current limiting resistor 124. Voltage regulator 130 provides power (e.g., 5V DC) to controller 102 and optionally other DPM components. Thus, first and second power supplies 112, 114 are each operable to provide power to controller 102 and any additional components in DPM 100 that require 5V DC.

The outputs of the respective power supplies both feed the voltage regulator 130 such that if one of the power supplies 112, 114 fails, the power to the voltage regulator 130 (and thus the controller 102) will not be interrupted. Therefore, in the event of the failure of one of the power supplies, the remaining power supply will continue to provide power to controller 102 and to the set of LED light fixtures connected to that remaining power supply. Therefore, only the LED light fixtures connected to the failed power supply will go dark; the remaining LED light fixtures will continue to function normally with the associated control signals being received and transmitted by controller 102.

First and second diodes 122, 126 act as current preventers to prevent current from one power supply from flowing through the other power supply. In a DPM including 48V power supplies, one of skill in the art will select various sizes for the first and second diodes based on the applications, however, it will be appreciated that it will be advantageous to select diodes with a low VF to ensure efficiency is not compromised in the circuit arrangement. Likewise, one of skill in the art will variously select the sizes for the current limiting resistors according to the size and ratings of the power supplies. The current prevention could alternatively be positioned within the power supply (and not an external diode). Thus, the current prevention can be outside the power supply or internal to the power supply.

In this configuration, each DC power supply is sized and used for powering one set of LED light fixtures. For example, power supply 1 112 would be sized to provide enough DC power to illuminate the maximum number of fixtures connectable to port 108 (for example, 32 fixtures). In addition, each DC power supply is also operable to power controller 102. The interconnection of the outputs 118, 120 of the power supplies via the first and second diodes 122, 126 allows for the system to provide redundant power to controller 102 such that, in the event of a power supply failure, only the LED light fixtures connected to the port associated with the failed power supply would go dark.

FIG. 4 is a detailed view of a portion of DPM 100 from FIG. 3. Wired transmitter 104 includes two outputs marked (+) and (−) respectively (collectively 132), which feed into port 1 108 for connection to the LED light fixtures to provide a control signal.

Also shown in FIG. 4 is power supply 1 112 that includes two inputs for receiving AC power input 116 and two outputs (collectively 118) labeled as (48V+) and (48V−) respectively. The (48V−) output is connected to ground and to port 1 108, while (48V+) output is connected to first output diode 122, and to port 1 108. The output 118 is provided to supply power to the set of LED light fixtures connected to port 1 108, as well as to provide power to voltage regulator 130 through first output diode 122 and resistor 124.

Voltage regulator 130 is provided with an input labeled (48V+), which is the input power and provides an output labeled (5V), which is provided to power controller 102.

Only a portion of DPM 100 is illustrated in FIG. 4, however, it will be understood that the same circuit configuration is utilized in connection with wired transmitter 2 106 and power supply 2 114.

In FIGS. 3 & 4, DPM 100 is illustrated with two ports (108, 110). However, as depicted in FIG. 1, and as will be understood by those of skill in the art, DPM 100 can be configured with any number of ports to provide power and control to any number of sets of LED light fixtures, and the structure previously described herein can be used to provide redundant power to controller 102. For example, where DPM 100 is configured to power and control three sets of LED light fixtures, a third power supply can be provided, and the output of the third power supply can be connected to voltage regulator 130 via a diode as previously described herein.

Figure 5:
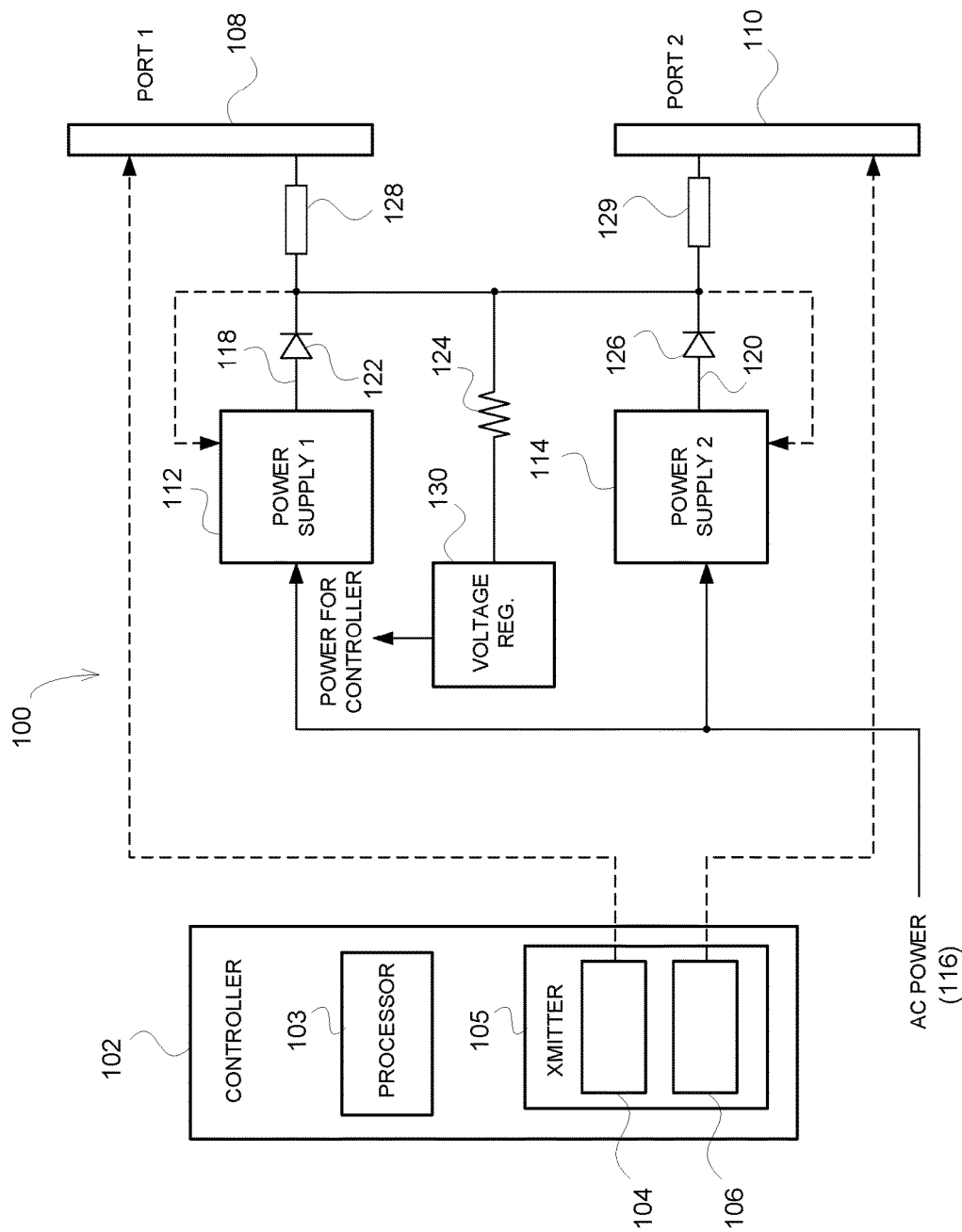
FIG. 5 is a block diagram according to FIG. 1.

Referring to FIG. 5, in a second configuration, power supply 1 112 and power supply 2 114 are employed to provide redundant power for each set of LED light fixtures as well as redundant power for controller 102. Preferably, each DC power supply is sized such that each one of the power supplies is capable of handling the full load of all the LED light fixtures connected to DPM 100, as well as controller 102. Thus, this configuration is similar to that in FIG. 3 providing for control redundancy, however, this configuration further provides for power redundancy to the various connected LED light fixtures. In this configuration, the diodes are positioned to allow power to flow from each power supply to each set of LED light fixtures. For example, first and second diodes 122,126 are connected to outputs 118, 120 respectively and to current limiting resistor 124 which is connected to voltage regulator 130. As in the first configuration described in connection with FIG. 3, this provides redundant power to voltage regulator 130. As previously discussed, first and second diodes 122, 126 act as current preventers to prevent current from one power supply from flowing through the other power supply, but in this configuration, power from one power supply can flow through all sets of LED light fixtures. Also shown in FIG. 5 are current limiters 128, 129 connected to the cathodes of diodes 122, 126 respectively. Current limiters 128, 129 may comprise any type of current limiting device as is known in the art including, for example, a hard fuse, a poly switch (semiconductor fuse), and electronic fuse, etc. Current limiters 128, 129 are provided primarily to protect the cabling that will be coupled to Port 1 108 and Port 2 110 seeing as the total amount of power that may be provided to the LED fixtures is equal to the sum of both power supplies. This configuration would result in all the LED lights being operational unless both of the DC power supplies simultaneously failed. In one configuration, a feedback mechanism may be provided for each power supply (shown in dashed line) as a sensed output voltage that is individually fed back to each power supply respectively, such that each power supply may independently control its output voltage. The feedback mechanism may comprise an external sense line that picks up the output voltage on the cathode sides of diodes 122, 126 respectively. This external sense line would typically be placed between diodes 122, 126 and current limiters 128, 129 respectively.

For example, power supply 1 112 and power supply 2 114 can each have their respective outputs 118, 120 connected together after first output diode 122 and second output diode 126. The individual power supplies are each sized to handle the entire load of LED light fixtures connected to both port 1 108 and port 2 110. In this manner, if either of the power supplies fails, the remaining power supply can fully power all the connected LED light fixtures, and controller 102. Another advantage of this configuration is that when both power supply 1 112 and power supply 2 114 are functioning during normal operation, each power supply will be running at approximately half its rated load, which will result in a longer lifespan and a greater Mean Time Before Failure (MTBF) for each of the power supplies.

In FIG. 5, DPM 100 is illustrated with two ports (108, 110). However, as will be understood by those of skill in the art, DPM 100 can be configured with any number of ports to provide power and control to any number of sets of LED light fixtures, and the structure previously described herein can be used to provide redundant power to all of the sets of LED light fixtures (and controller 102). For example, where DPM 100 is configured to power and control three sets of LED light fixtures, a third power supply can be provided, and the output of the third power supply can be connected to the outputs of the first and second power supplies as previously described herein to provide redundant power to all sets of LED light fixtures, and/or controller 102. Each DC power supply can be sized to power all sets of LED light fixture, and in that case, all sets of LED light fixtures will remain operational unless all DC power supplies fail, and under normal operation each power supply will run at a fraction (e.g., one-third) of its rated load.

Figure 6:
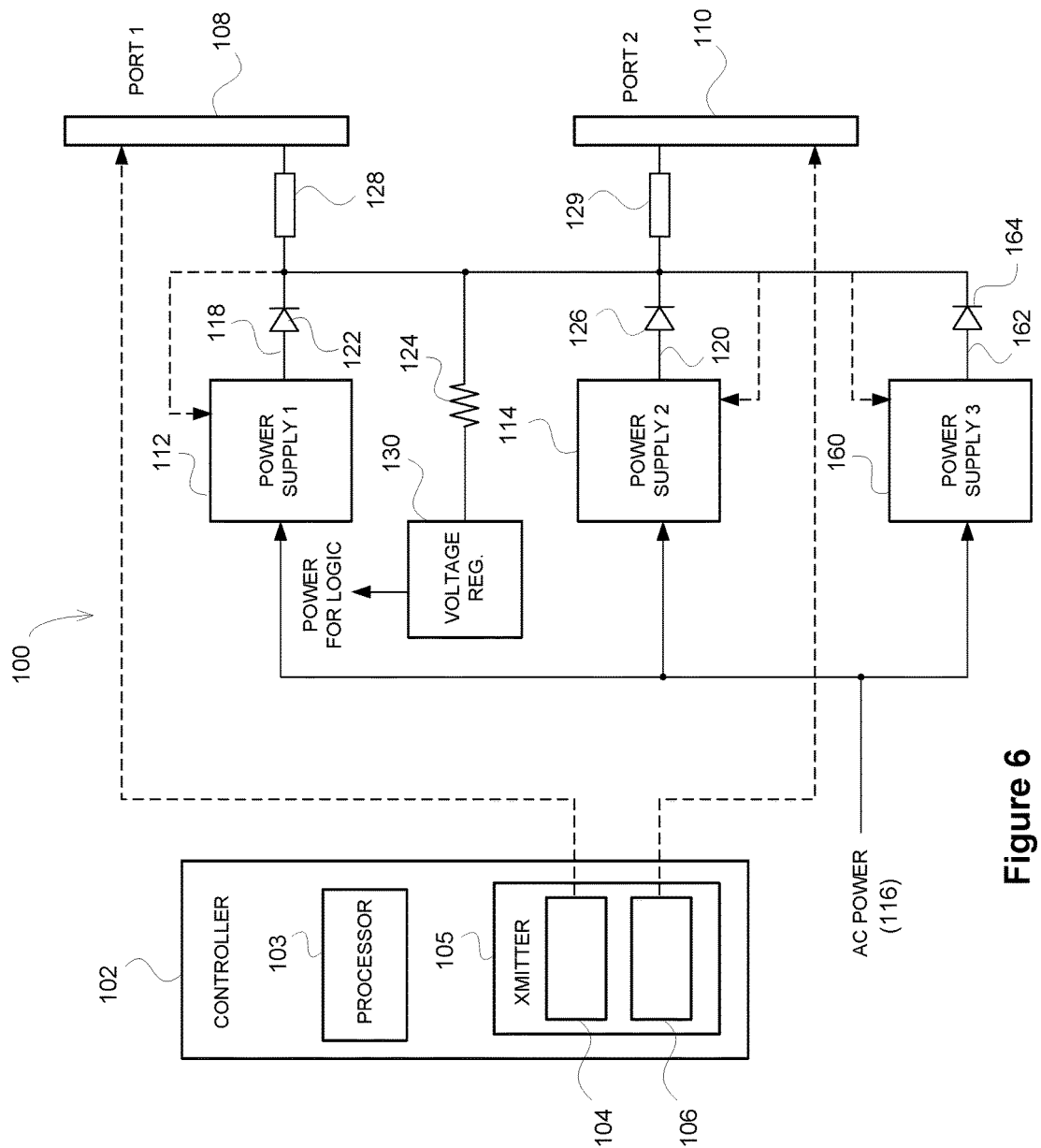
FIG. 6 is a block diagram according to FIG. 5.

Referring to FIG. 6, in a third configuration, the system may be provided with a spare (or additional) DC power supply. For example, a DPM 100 configured to power two sets of LED light fixtures can have three DC power supplies, each of which is operable to power at least one set of LED light fixtures. The idea behind this configuration (N+1) is that, if any single DC supply fails, the remaining (two) power supplies can handle the full load. This configuration is referred to as the N+1 configuration because a spare (additional) one (1) power supply 160 is provided for the number (N) of ports.

As described above with respect to the second configuration, output 162 of power supply 3 160 is coupled to output 118 of power supply 1 112 and output 120 of power supply 2 114. The output 162 of power supply 3 160 can feed into third output diode 164 before it connects to the first and second output diodes 124, 128. Current limiters 128, 129 are also shown in FIG. 6 connected to the cathodes of diodes 122, 126 respectively. As discussed previously, current limiters 128, 129 may comprise any type of current limiting device as is known in the art including, for example, a hard fuse, a poly switch (semiconductor fuse), and electronic fuse, etc. Current limiters 128, 129 are provided primarily to protect the cabling that will be coupled to Port 1 108 and Port 2 110 seeing as the total amount of power that may be provided to the LED fixtures is equal to the sum of both power supplies. Similar to the configuration in FIG. 5, a feedback mechanism (shown in dashed line) may be provided for each power supply as a sensed output voltage that is individually fed back to each power supply respectively, such that each power supply may independently control its output voltage. The feedback mechanism may comprise an external sense line as described in connection with FIG. 5, however, the difference in this configuration being that a third external sense line would be provided for feedback for power supply 3 160.

The N+1 configuration provides similar advantages as discussed in connection with the second configuration depicted in FIG. 5 in that, due to the presence of the additional DC power supply, during normal operation, all the DC supplies share the load and are thus not being driven at full power thus increasing MTBF of all power supplies. In this case, each power supply will be running at approximately one third its rated load, which will result in an even longer lifespan and a greater Mean Time Before Failure (MTBF) for each of the power supplies. Alternatively, each power supply could be sized such that any two power supply could provide power for all light fixtures connected to Port 1 108 and Port 2 110. The advantage of this configuration would allow for a reduction in the size of each power supply thereby reducing cost and weight, while at the same time, providing redundancy and running the power supplies at a load less than the full rating of the three power supplies to still increase MTBR despite the reduction in size of each individual power supply.

While the N+1 configuration illustrates three power supplies servicing two ports, it is contemplated that additional ports and power supplies could be used. For example, in FIG. 1 the DPM 100 shows three ports 108, 110, 111 and in an N+1 configuration the DPM 100 could be supplied with four power supplies and so on.

Figure 7:
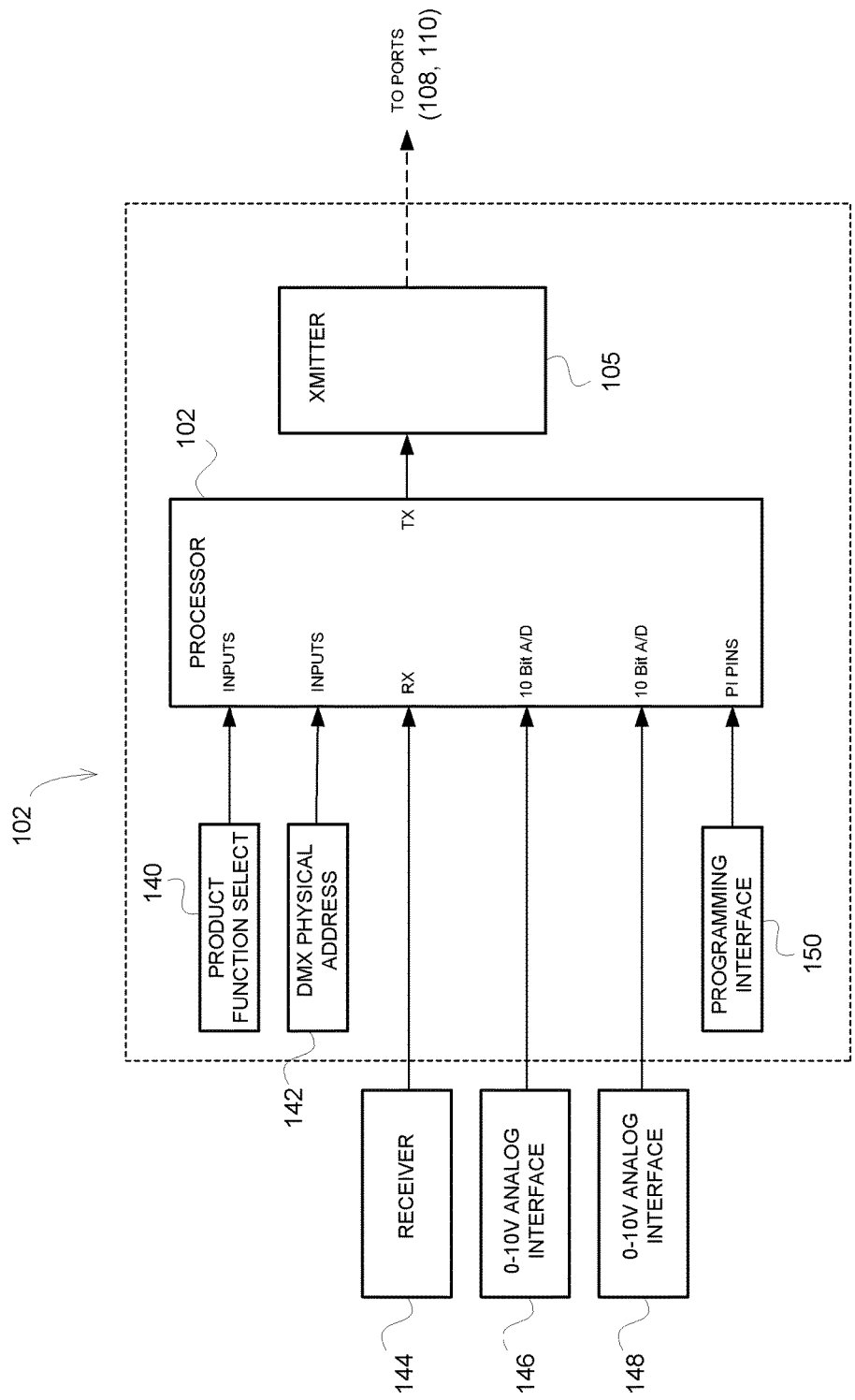
FIG. 7 is a block diagram according to FIG. 1.

FIG. 7 provides a view of the inputs to controller 102 and processor 103 of DPM 100. There are two "inputs" pins listed in connection with processor 103. The first is labeled product function selection 140 and is a setting that may be set to correspond with the product that is to be connected to DPM 100. Also show is DMX physical address 142, which is an address that may be set for use in conjunction with DMX control. Both of these are on board settings for DPM 100.

Also illustrated in FIG. 7 is receiver 144, which is designed to receive a control input, such as a DMX control signal, that is in turn, transmitted to processor 103 for processing. Based on the received and processed control signal, controller 102 will control the function of the connected LED light fixtures.

Two 0-10V analog interfaces 146, 148 are further shown in FIG. 7. These correspond to alternative controls for controlling the LED light fixtures that are variously connected to DPM 100. These alternative controls are typically wall mounted dimmers that may be used to control the brightness and/or color of the connected LED light fixtures.

Finally, programming interface 150 is shown providing an input to processor 103. Programming interface 150 provides an input for the setting of programmed functionality in processor 103. While not shown, it is understood that processor 103 is provided with a memory feature that may allow for programs to be stored on processor 103 or for processor 103 to be programmed to perform various functions.

In addition to or as an alternative to the diodes 122, 126 employed to interconnect the outputs of the various power supplies as described above, a Field Effect Transistor (FET) could be used in place of diodes for controlled interconnection of the various outputs. For example, a FET could be used such that the various outputs of the power supplies are connected to the gate of the FET and the drain is connected to the various Ports for connection to the LED fixtures.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An LED lighting system for controlling and providing power to at least a first set of one or more LED light fixtures and a second set of one or more LED light fixtures, the LED lighting system comprising:
    a digital power module having:
        a first DC power supply having a first output operable to supply power to said first set of LED light fixtures;
        a second DC power supply having a second output operable to supply power to said second set of LED light fixtures;
        said first output being connected to said second output;
        a first current preventer operable to prevent current passing through the first power supply from the second power supply, and a second current preventer operable to prevent current passing through said second power supply from said first power supply;
        a controller operable to receive a control input signal from an interface for controlling said first and second sets of LED light fixtures;
        said controller being operable to transmit one or more control signals to said first and second sets of LED light fixtures, the one or more control signals being independent of the power supplied to the first and second sets of LED light fixtures; and
    said first and second DC power supplies each being operable to independently power both said first and second sets of LED light fixtures simultaneously.

2. The LED light system of claim 1 wherein said first and second DC power supplies are each operable to power said controller.

3. The LED light system of claim 2 further comprising a voltage regulator, wherein said first output and said second output are connected to an input of the voltage regulator, and wherein said voltage regulator is coupled to and operable to power to said controller.

4. The LED light system of claim 1 further comprising a first diode connected to a positive terminal of said first output and a second diode connected to a positive terminal of said second output.

5. The LED light system of claim 4 further comprising a resistor connected in series with said first diode and in series with said second diode.

6. The LED light system of claim 1 wherein said first set of LED light fixtures comprises a plurality of LED light fixtures and said second set of LED light fixtures comprises a plurality of LED light fixtures.

7. The LED light system of claim 1 further comprising:
    a first feedback signal representative of an output voltage of said first DC power supply and provided to an input of said first DC power supply and said first DC power supply being configured to adjust the output voltage according to the first feedback signal; and
    a second feedback signal representative of an output voltage of said second DC power supply and provided to an input of said second DC power supply and said second DC power supply being configured to adjust the output voltage according to the second feedback signal.

8. An LED lighting system comprising:
    a plurality of sets of LED light fixtures consisting of N sets of LED light fixtures:
    a digital power module having:
        a plurality of N power supplies, each one of said plurality of N power supplies being operable to supply power to at least one of said plurality of sets of LED light fixtures;
        an additional (+1) power supply operable to supply power to at least one of said plurality LED light fixtures;
        outputs of each of said plurality of N power supplies and said additional (+1) power supply being connected;
        current preventers operable to prevent current passing through said plurality of N power supplies and said additional (+1) power supply from another of said power supplies;
        a controller operable to receive a control input signal to control said plurality of sets of LED light fixtures, and operable to transmit one or more control signals to said plurality of sets of LED light fixtures, said one or more control signals being independent of said power supplied to said plurality of sets of LED light fixtures;
    a plurality of feedback signals corresponding to said plurality of N power supplies, each of said plurality of feedback signals representative of an output voltage of one of said plurality of N power supplies respectively; and said plurality of feedback signals being provided to an input of each of said plurality of N power supplies to which the feedback signal corresponds, and each of said plurality of N power supplies being configured to adjust its output voltage according to the respective feedback signal provided.

9. The LED system of claim 8 wherein:
said plurality of N power supplies and said additional (+1) power supply each being operable to power said controller.

10. The LED system of claim 8 wherein:
said additional (+1) power supply being operable to supply power to any one of said plurality sets of LED light fixtures.

11. The LED system of claim 10 wherein:
said plurality of N power supplies and said additional (+1) power supply being operable to simultaneously supply power to each one of said plurality sets of LED light fixtures.

12. An LED lighting system for controlling and providing power to at least a first set of one or more LED light fixtures and a second set of one or more LED light fixtures, the LED lighting system comprising:
a digital power module having:
a first DC power supply having a first output operable to supply power to said first set of LED light fixtures;
a second DC power supply having a second output operable to supply power to said second set of LED light fixtures;
said first output being connected to said second output;
a first current preventer operable to prevent current passing through the first power supply from the second power supply, and a second current preventer operable to prevent current passing through said second power supply from said first power supply;
a controller operable to receive a control input signal from an interface for controlling said first and second sets of LED light fixtures;
said controller being operable to transmit one or more control signals to said first and second sets of LED light fixtures, the one or more control signals being independent of the power supplied to the first and second sets of LED light fixtures;
said first and second DC power supplies each being operable to power said controller;
a voltage regulator having an input and an output;
said first output and said second output are connected to the input of said voltage regulator; and
said voltage regulator being coupled to and operable to power to said controller.

13. The LED light system of claim 12 further comprising a first diode connected to a positive terminal of said first output and a second diode connected to a positive terminal of said second output.

14. The LED light system of claim 13 further comprising a resistor connected in series with said first diode and in series with said second diode.

15. The LED light system of claim 12 wherein said first set of LED light fixtures comprises a plurality of LED light fixtures and said second set of LED light fixtures comprises a plurality of LED light fixtures.

16. An LED lighting system for controlling and providing power to at least a first set of one or more LED light fixtures and a second set of one or more LED light fixtures, the LED lighting system comprising:
a digital power module having:
a first DC power supply having a first output operable to supply power to said first set of LED light fixtures;
a second DC power supply having a second output operable to supply power to said second set of LED light fixtures;
said first output being connected to said second output;
a first current preventer operable to prevent current passing through the first power supply from the second power supply, and a second current preventer operable to prevent current passing through said second power supply from said first power supply;
a controller operable to receive a control input signal from an interface for controlling said first and second sets of LED light fixtures; and
said controller being operable to transmit one or more control signals to said first and second sets of LED light fixtures, the one or more control signals being independent of the power supplied to the first and second sets of LED light fixtures;
a first feedback signal representative of an output voltage of said first DC power supply and provided to an input of said first DC power supply and said first DC power supply being configured to adjust the output voltage according to the first feedback signal; and
a second feedback signal representative of an output voltage of said second DC power supply and provided to an input of said second DC power supply and said second DC power supply being configured to adjust the output voltage according to the second feedback signal.

17. The LED light system of claim 16 wherein said first and second DC power supplies are each operable to power said controller.

18. The LED light system of claim 17 further comprising a voltage regulator, wherein said first output and said second output are connected to an input of the voltage regulator, and wherein said voltage regulator is coupled to and operable to power to said controller.

19. The LED light system of claim 16 further comprising a first diode connected to a positive terminal of said first output and a second diode connected to a positive terminal of said second output.

20. The LED light system of claim 19 further comprising a resistor connected in series with said first diode and in series with said second diode.

21. The LED light system of claim 16 wherein said first set of LED light fixtures comprises a plurality of LED light fixtures and said second set of LED light fixtures comprises a plurality of LED light fixtures.

\* \* \* \* \*